(12) United States Patent
Choi et al.

(10) Patent No.: US 7,558,457 B2
(45) Date of Patent: Jul. 7, 2009

(54) COMBINED ILLUMINATION AND VENTILATION DUCT

(75) Inventors: Keun Hyoung Choi, Seoul (KR); In Ho Choi, Gunpo-si (KR); Dong Whan Choi, Busan (KR); Ho Seon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/383,833

(22) Filed: May 17, 2006

(65) Prior Publication Data

US 2006/0263032 A1 Nov. 23, 2006

(30) Foreign Application Priority Data

May 20, 2005 (KR) .................. 10-2005-0042497

(51) Int. Cl.
*G02B 6/00* (2006.01)
*F21V 29/00* (2006.01)

(52) U.S. Cl. .................. 385/133; 385/147; 362/580

(58) Field of Classification Search .................. 362/580, 362/558; 385/133, 147

See application file for complete search history.

(56) References Cited

U.S. PATENT DOCUMENTS 1,254,520 A * 1/1918 MacDuff .................. 359/597
3,751,613 A * 8/1973 Inose et al. .............. 200/61.08
5,363,464 A * 11/1994 Way et al. ................. 385/125
5,845,037 A * 12/1998 Miekis ..................... 385/136

FOREIGN PATENT DOCUMENTS

| CN | 1465882 | 1/2004 |
| CN | 2644963 Y | 9/2004 |
| FR | 2718821 | 10/1995 |
| JP | 2003-050044 | 2/2003 |

OTHER PUBLICATIONS

U.S. Appl. No. 11/419,340, filed May 19, 2006, Ju Youn Lee et al.
English language Abstract of JP 2003-050044.
English language Abstract of CN 1465882.
English language Abstract of FR 2718821.

* cited by examiner

*Primary Examiner*—Jerry T Rahll
(74) *Attorney, Agent, or Firm*—McKenna Long & Aldridge

(57) ABSTRACT

A combined illumination and ventilation duct is disclosed. The present invention includes at least two optical pipes having air flown inside wherein light proceeds within the at least two optical pipes by being totally reflected and a connector connecting the at least two optical pipes together, the connector having a connecting nipple to be connected to a pipe. An upper part of the duct is embedded in a fake ceiling under a real ceiling and a lower part is exposed under the fake ceiling. Alternatively, the whole combined illumination and ventilation duct is installed to be exposed under the fake ceiling. As air and light pass through the combined illumination and ventilation duct, the light is totally reflected within the optical pipes to illuminate an indoor space and the air is supplied or discharged to ventilate the indoor space.

20 Claims, 8 Drawing Sheets

COMBINED ILLUMINATION AND VENTILATION DUCT

This application claims the benefit of the Korean Patent Application No. P2005-42497, filed on May 20, 2005, which is hereby incorporated by reference as if fully set forth herein.

BACKGROUND OF THE INVENTION

1. Field of the Invention

The present invention relates to a duct, and more particularly, to a combined illumination and ventilation duct. Although the present invention is suitable for a wide scope of applications, it is particularly suitable for illuminating and ventilating an indoor space.

2. Discussion of the Related Art

Generally, various ventilators for indoor space ventilation and various illuminators for providing predetermined intensity of illumination to an indoor space are installed in houses, large buildings and factory facilities.

A ventilator consists of a duct on a ceiling of an indoor space to form a moving passage of air and a fan module sucking/blowing air into/from the duct. And, the ventilator may further consist of an electric heat exchanger to recover thermal energy contained in indoor air in part.

Meanwhile, the illuminator consists of various lamps electrically connected to various wires to artificially illuminate the indoor space. Recently, a predetermined intensity of illumination can be provided to an indoor and/or outdoor space using an optical pipe. The optical pipe enables total reflection of light generated from a lamp, thereby being advantageous in aspect of light loss on propagation.

However, the related art illuminator and ventilator have the following problems.

First of all, since a space for the related art illuminator and a space for the related art ventilator are separately provided to an indoor space, sufficient spaces are needed to accommodate various devices. And, wiring becomes very complicated. Moreover, in case of installing an illuminator having an optical pipe, a duct needs to be separate from the optical pipe to be arranged on a ceiling. So, an installation space increases and the installation and design become more complicated.

Secondly, an optical pipe and duct need to be arranged on optimal positions for illumination and ventilation, respectively. For this, if the positions are overlapped with each other, either illumination efficiency or ventilation efficiency has to be reduced.

SUMMARY OF THE INVENTION

Accordingly, the present invention is directed to a combined illumination and ventilation duct that substantially obviates one or more problems due to limitations and disadvantages of the related art.

An object of the present invention is to provide a combined illumination and ventilation duct, by which installation and occupied spaces can be reduced by enabling simultaneous illumination and ventilation.

Another object of the present invention is to provide a combined illumination and ventilation duct, by which installation and arrangement are facilitated by enabling several ducts to be easily joined together.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a combined illumination and ventilation duct according to the present invention includes at least two optical pipes through which air flows and through which light proceeds by being totally reflected, and a connector connecting the at least two optical pipes together, the connector having a connecting nipple to be connected to a pipe.

The connector may be formed of a flexible material.

The connector may be detachably connected to each of the at least two optical pipes.

The connector may be cut along a length direction to be open or closed.

The connector may include a pair of extensions extending from both edges of the cut connector, respectively, a pair of the extensions adhering closely to each other when the connector is closed, the extensions fixed to each other by a coupling member.

The connector may further include a support extending from at least one of the extensions to be securely fixed to a ceiling by a fastening member.

The connecting nipple may be projected from an outer surface of the connecter to be arranged between a center and upper end of the connector.

Opposing end portions of the at least two optical pipes connected together by the connector may be aligned within the connector to be spaced apart from each other and the connecting nipple may be arranged between the opposing end portions of the at least two optical pipes.

The combined illumination and ventilation duct may further include at least one projection provided on an outer circumference of an end portion of each of the at least two optical pipes, and at least one groove provided to an inner circumference of the connector to correspond to the at least one projection.

The at least one projection and groove may be formed along circumferential directions of each of the at least two optical pipes and the connector, respectively.

The pipe connected to the connecting nipple may be connected to a diffuser communicating with an indoor space.

Each of the at least two optical pipes may include a tube transmitting a light and a total reflection layer formed on an inner surface of the tube to totally reflect the light.

The combined illumination and ventilation duct may further include a separating member separating the air and the light flowing through the duct from each other to flow.

Alternatively, the combined illumination and ventilation duct may further include a separating plate provided within each of the at least two optical pipes or the connector to divide an internal space of the connector into an upper space for air flow and a lower space for light flow.

A total reflection layer may be formed on an inner surface of each of the at least two optical pipes and a lower surface of the separating plate to totally reflect the light.

Alternatively, the combined illumination and ventilation duct may further include a separating pipe provided within each of the at least two optical pipes or the connector to divide an internal space of the connector into an upper space for air flow and a lower space for light flow.

A total reflection layer may be formed on an inner surface of each of the at least two optical pipes and an outer surface of the separating pipe to totally reflect the light.

The combined illumination and ventilation duct may further include a supporter provided between the separating pipe and each of the at least two optical pipes or the connector to support the separating pipe to lie in a center of each of the at least two optical pipes or the connector.

The separating pipe may further include a connecting nipple and wherein the combined illumination and ventilation duct may further comprise a connecting pipe connecting the connecting nipple of the separating pipe and the connecting nipple of the connector together.

In another aspect of the present invention, a combined illumination and ventilation duct includes at least two optical pipes having air flown inside wherein light proceeds within the at least two optical pipes by being totally reflected and wherein upper parts of the at least two optical pipes are embedded in a fake ceiling provided under a real ceiling to be spaced apart from the real ceiling, a connector connecting the at least two optical pipes together, the connector having a connecting nipple arranged between the fake and the real ceilings, and a diverging pipe connected to the connecting nipple.

In another aspect of the present invention, a combined illumination and ventilation duct includes at least two optical pipes having air flown inside wherein light proceeds within the at least two optical pipes by being totally reflected wherein the at least two optical pipes are arranged under a fake ceiling provided under a real ceiling to be spaced apart from the real ceiling, a connector connecting the at least two optical pipes together, the connector having a connecting nipple in the vicinity of the fake ceiling, and a diverging pipe arranged to penetrate the fake ceiling, the diverging pipe connected to the connecting nipple.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
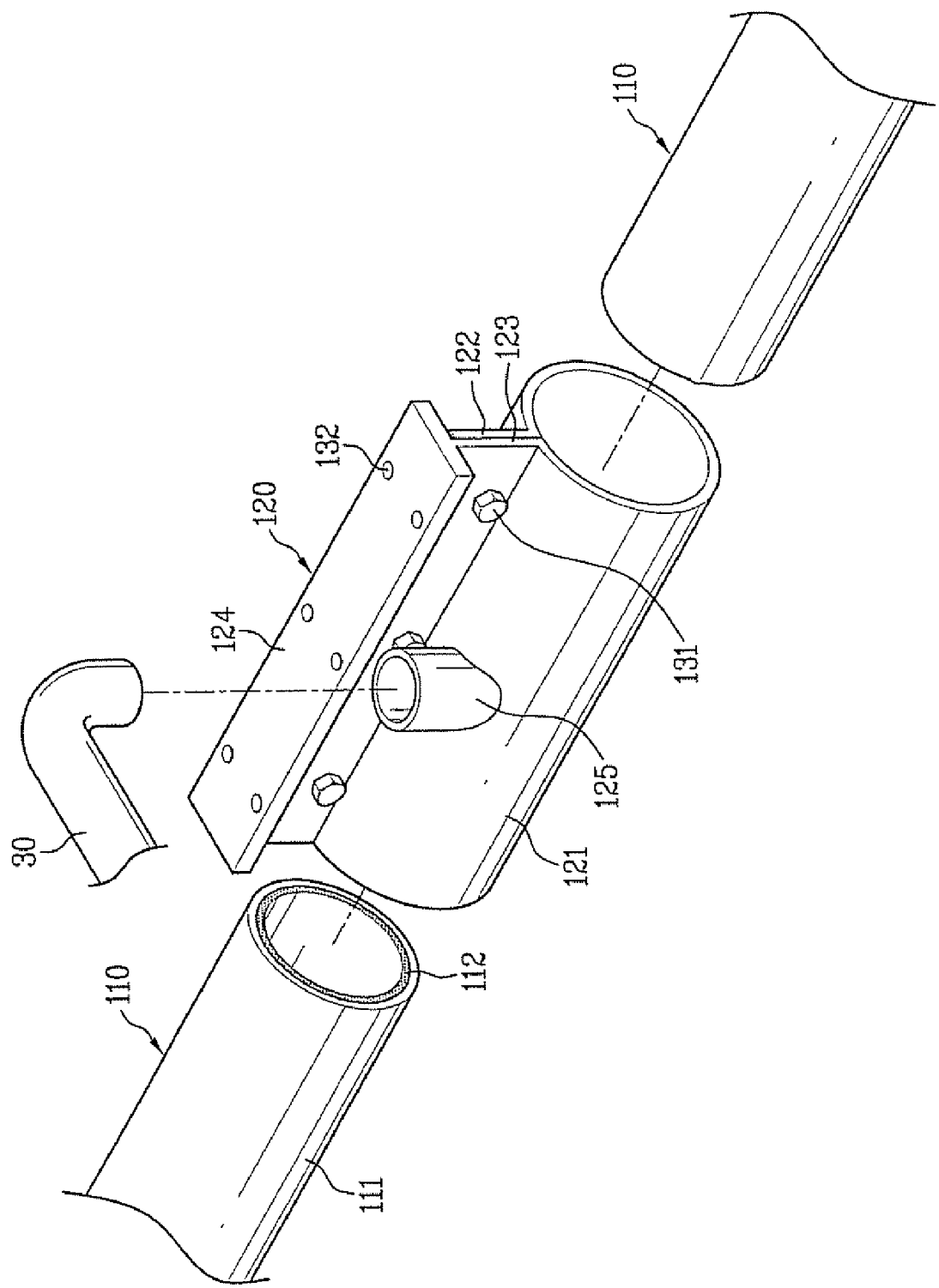
FIG. 1 is an exploded perspective diagram of a combined illumination and ventilation duct according to a first embodiment of the present invention.
Figure 2:
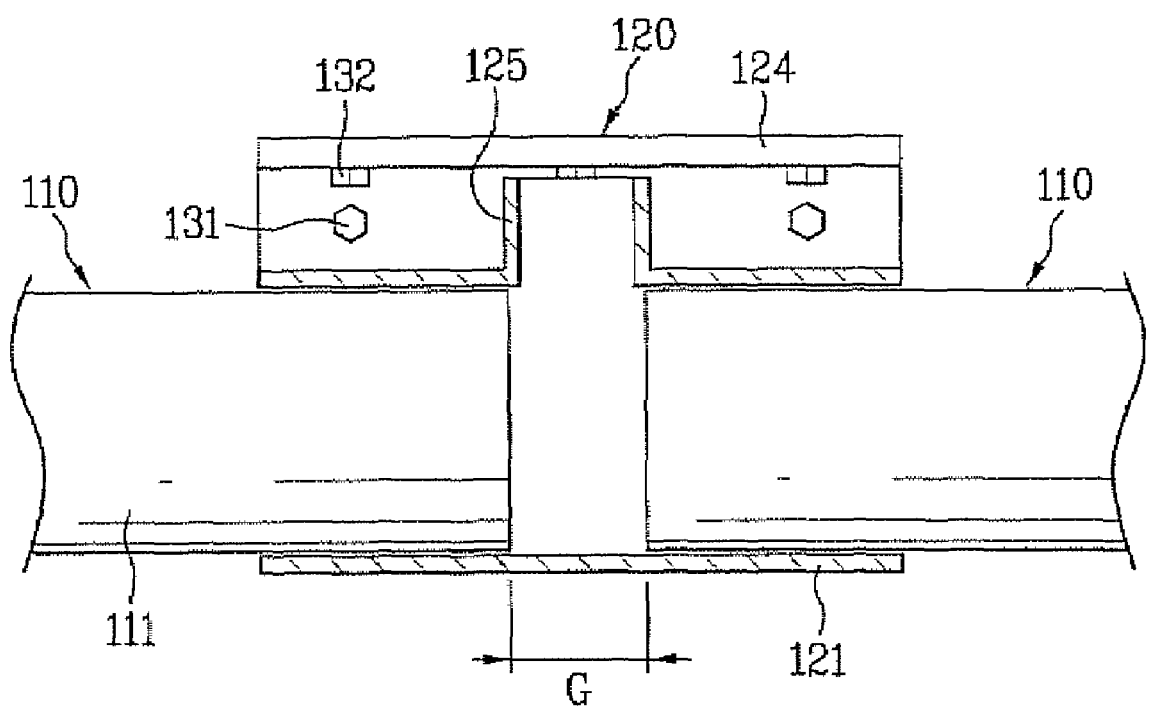
FIG. 2 is a cross-sectional diagram of the duct shown in FIG. 1.

FIG. 1 is an exploded perspective diagram of a combined illumination and ventilation duct according to a first embodiment of the present invention and FIG. 2 is a cross-sectional diagram of the duct shown in FIG. 1.

A configuration of a combined illumination and ventilation duct according to a first embodiment of the present invention is explained in detail with reference to FIG. 1 and FIG. 2 as follows.

Referring to FIG. 1 and FIG. 2, a combined illumination and ventilation duct according to a first embodiment of the present invention includes at least two optical pipes 110 and at least one connector 120 connecting the at least two optical pipes 110 together.

Each of the at least two optical pipes 110 includes a tube 111 formed of a light-transmittable material such as a synthesized resin, and more particularly, an acryl based material, and a total reflection layer 112 formed on an inner circumference of the tube 111.

Since the total reflection layer 112 reflects light totally, artificial or natural light applied into the tub 111 is totally reflected within the tub 111 to proceed in a length direction of the tube 111. And, air supplied into the tub 111 proceeds in the length direction of the tube 11 as well.

The connector 120, as shown in FIG. 1 and FIG. 2, is connected to end portions of the at least two optical pipes 110 to join them together. Preferably, the connector 120 is formed of a flexible material. This is to prevent an end portion of the optical pipe 110 from being broken or damaged. And, it is preferable that the connector 120 is detachable from the optical pipe 110.

For instance, the connector 120 includes a cylindrical body 121 connected to the optical pipe 110 and a connecting nipple 125 projected from the body 121.

The body 121 is configured to enclose the end portions of the optical pipes 110 to connect together. In this case, an inner circumference of the connector 120 is preferably formed to have a high frictional coefficient to prevent the end portion of the optical pipe 110 from being separated from the connector 120.

An inner surface of the body 121 of the connector 120 is preferably configured to have a radius slightly smaller than that of an outer surface of the optical pipe 110. If so, the connector 120 fastens the end portion of the optical pipe 110 when the connector 120 and the optical pipe 100 are connected together. Hence, the optical pipe is prevented from being separated from the connector 120.

Alternatively, the body 121 is configured to be fitted into the inner surface of the optical pipe 110, thereby being able to connect the at least two optical pipes 110 together. In this case, an outer circumference of the connector 120 is preferably formed to have a high frictional coefficient enough not to be separated from the corresponding optical pipe 110.

The connecting nipple 125, as shown in FIG. 1, is upwardly projected from a middle part of the body 121 of the connector 120. One end of a diverging pipe 30, as shown in FIG. 1, is connected to the connecting nipple 125. And, the other end of the diverging pipe 30 is connected to a diffuser 40 (see FIG. 5 and FIG. 6). Thus, the connecting nipple 125 is provided to an upper part of the body 121. This is to prevent the diverging pipe 30 from being exposed to an indoor space.

If the two optical pipes 110 are connected to each other using the connector 120 having the connecting nipple 110, it is advantageous in that the optical pipe 110 needs not to be separately processed to be connected to the diverging pipe 30.

The opposing end portions of the two optical pipes 110 connected together by the connector 120, as shown in FIG. 2, are spaced apart from each other to leave a predetermined gap "G" in-between. And, the connecting nipple 125 is preferably arranged between the opposing end portions of the two optical pipes 110. In this case, the opposing end portions of the two optical pipes 110 can be installed to be spaced apart from each other by a diameter of the connecting nipple 125. Such a connecting configuration enables a light loss generating part to be reduced by an amount corresponding to the gap between the opposing end portions of the two optical pipes 110.

Meanwhile, an upper part of the body 121, as shown in FIG. 1, is cut in a length direction. Extensions 122 and 123 can be upwardly provided to both circumference-directional edges of the body 121, respectively. A support 124 can be provided to at least one upper end of the extensions 122 and 123 to support the connector 120 on a ceiling.

The extensions 122 and 123 are aligned to adhere closely to each other while the body 121 and the optical pipe 110 are temporarily connected. The extensions 122 and 123 are then mutually fixed to each other by a coupling member 131. If so, the body 121 and the optical pipe 110 are stably joined together to be hardly separated from each other. The support 124 is firmly fixed to a ceiling by a fastening member 132. By the support 124 and the fastening member 132, the connector 120 and the optical pipes 110 connected to the connector 120 are supported to be hung on the ceiling.

Figure 3:
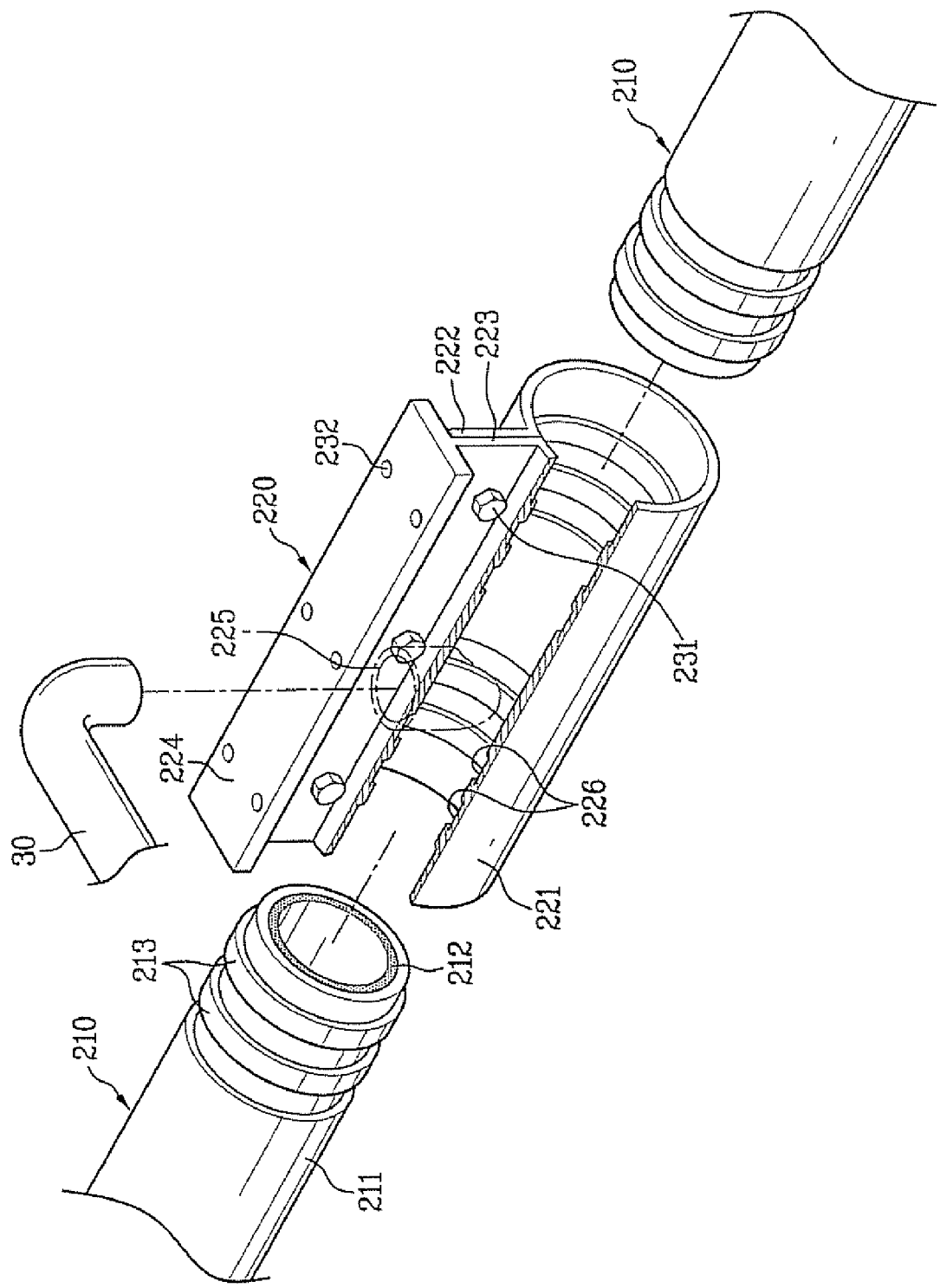
FIG. 3 is an exploded perspective diagram of a combined illumination and ventilation duct according to a second embodiment of the present invention.
Figure 4:
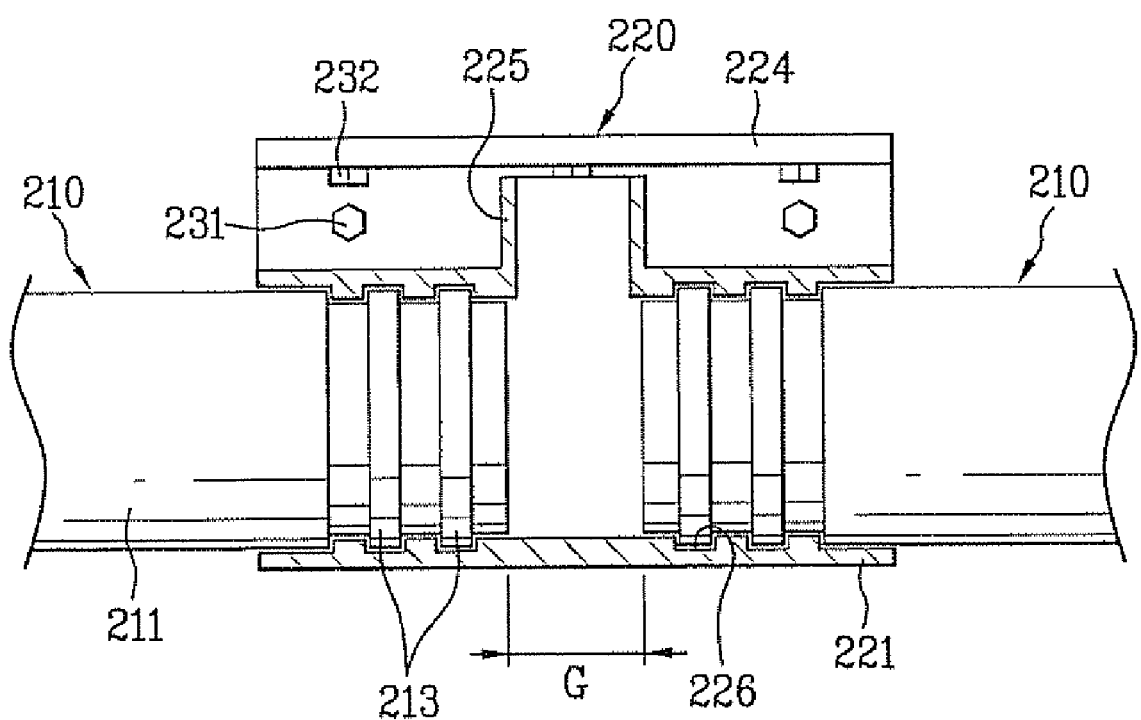
FIG. 4 is a cross-sectional diagram of the duct shown in FIG. 3.

FIG. 3 is an exploded perspective diagram of a combined illumination and ventilation duct according to a second embodiment of the present invention and FIG. 4 is a cross-sectional diagram of the duct shown in FIG. 3. Configurational differences between a combined illumination and ventilation duct according to a second embodiment of the present invention and that of the former embodiment of the present invention are explained in detail as follows.

Referring to FIG. 3 and FIG. 4, a combined illumination and ventilation duct according to a second embodiment of the present invention includes at least two connected optical pipes 210 and a connector 220. A reference number 211 in FIG. 3 or FIG. 4 denotes a tube corresponding to the former tube 111 and a reference number 212 denotes a total reflection layer corresponding to the former total reflection layer 112. A reference number 221 denotes a body of the connector 220 corresponding to the former body 110. Reference numbers 222 and 223 denote first and second extensions of the connector 220 corresponding to the firmer first and second extension 122 and 123, respectively. A reference number 224 denotes a support of the connector 220 corresponding to the former support 124. And, a reference number 225 denotes a connecting nipple of the connector 220 corresponding to the former nipple 125.

At least one projection 213, as shown in FIG. 3 and FIG. 4, is formed on an outer circumference of an end portion of each of the optical pipes 210 and a groove 226 is formed on an inner circumference of the connector 220 to correspond to the projection 213. In this case, the projection 213 and groove 226 prevent the corresponding optical pipe 210 from being separated from the connector 220 and guides an accurate installation position of the corresponding optical pipe 210.

The projection 213 is formed on an outer circumference of the tube 211 in a circumferential direction of the tube 211. For instance, the projection 213 can be formed to have a ring shape or a helical shape along the circumferential direction of the tube 211. Yet, the projection 213 can be modified into various shapes to prevent the end portion of the optical pipe 210 from being separated from the connector 220.

Preferably, the inner circumference of the connector 220 is configured to have a radius slightly smaller than that of the outer circumference of the corresponding optical pipe 210. If so, the body 221 of the connector 220 fastens the end portion of the optical pipe 210 when the first and second extensions 222 and 223 are coupled together using the coupling member 231. Hence, the optical pipe 210 is prevented from being separated from the connector 220

The opposing end portions of the two optical pipes 210 connected together by the connector 220, as shown in FIG. 4, are spaced apart from each other to leave a predetermined gap "G" in-between. And, the connecting nipple 225 is preferably arranged between the opposing end portions of the two optical pipes 210. For instance, the opposing end portions of the two optical pipes 110 can be preferably installed to be spaced apart from each other by a diameter of the connecting nipple 225. Preferably, the connecting nipple 225 is provided between a center of the body 221 of the connector 220 and an upper end of the body 221 of the connector 220.

An installation of the above-configured combined illumination and ventilation duct according to the present invention is explained as follows.

First of all, a corresponding end portion of the optical pipe 110, 210 is inserted in the connector 120, 220 while the connector 120, 220 is slightly widened. In this case, both end portions of the connector 120, 220 are aligned to oppose each other by leaving the connecting nipple 125, 225 in-between.

The first and second extensions 122, 222 and 123, 223 of the connector 120, 220 are brought into contact with each other and are then coupled together using the coupling member 131, 231. As the first and second extensions 122, 222 and 123, 223 are coupled together, the body 121, 221 of the connector 120, 220 and the corresponding end portion of the optical pipe 110, 210 can be stably joined together.

In the combined illumination and ventilation duct according to the first embodiment of the present invention, the frictional power of the connector 120 can prevent the optical pipe 110 from being separated. Yet, in the combined illumination and ventilation duct according to the second embodiment of the present invention, the projection 213 of the optical pipe 210 and the grove 226 of the connector 220 prevent the optical pipe 210 from being separate.

After the support 124, 224 has been aligned on a ceiling, the fastening member 132, 232 fastens the support to the ceiling. So, the optical pipes 110, 210 can be provided to the ceiling. In the present invention, the optical pipes 110, 210 and the connector 120, 220 can be installed in a manner that lower parts of them, as shown in FIG. 5, are exposed to an indoor space or that they, as shown in FIG. 6, are totally exposed to the indoor space.

Figure 5:
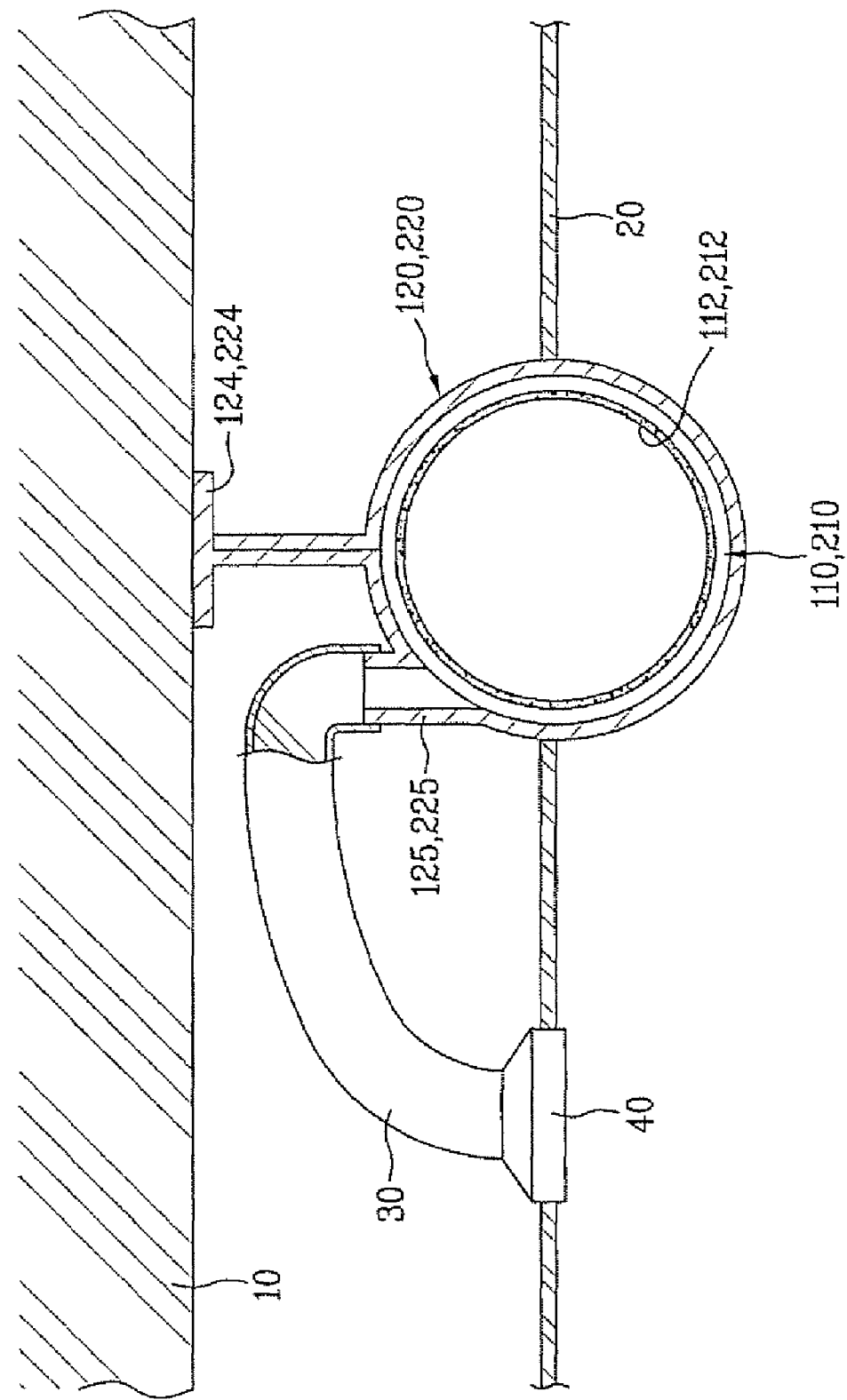
FIG. 5 and FIG. 6 are cross-sectional diagrams of the ducts shown in FIGS. 1 to 4, in which each of the ducts is installed on a ceiling.

In FIG. 5, middle parts of the optical pipes 110, 210 and the connector 120, 220 are arranged to penetrate a fake ceiling 20, formed of a board or the like, which is arranged under a real ceiling 10 formed of a concrete or steel frame. And, the support 124, 224 is securely fixed to the real ceiling 10 above the fake ceiling 20.

If so, lower parts of the optical pipes 110, 210 and the connector 120, 220 are exposed under the fake ceiling 20 and upper parts thereof are hidden behind the fake ceiling 20. In this case, since the connecting nipple 125, 225 is hidden behind the fake ceiling 20, the diverging pipe 30 connecting the connecting nipple 125, 225 and the diffuser 40 provided to the fake ceiling 20 together is hidden behind the fake ceiling 20 as well.

Figure 6:
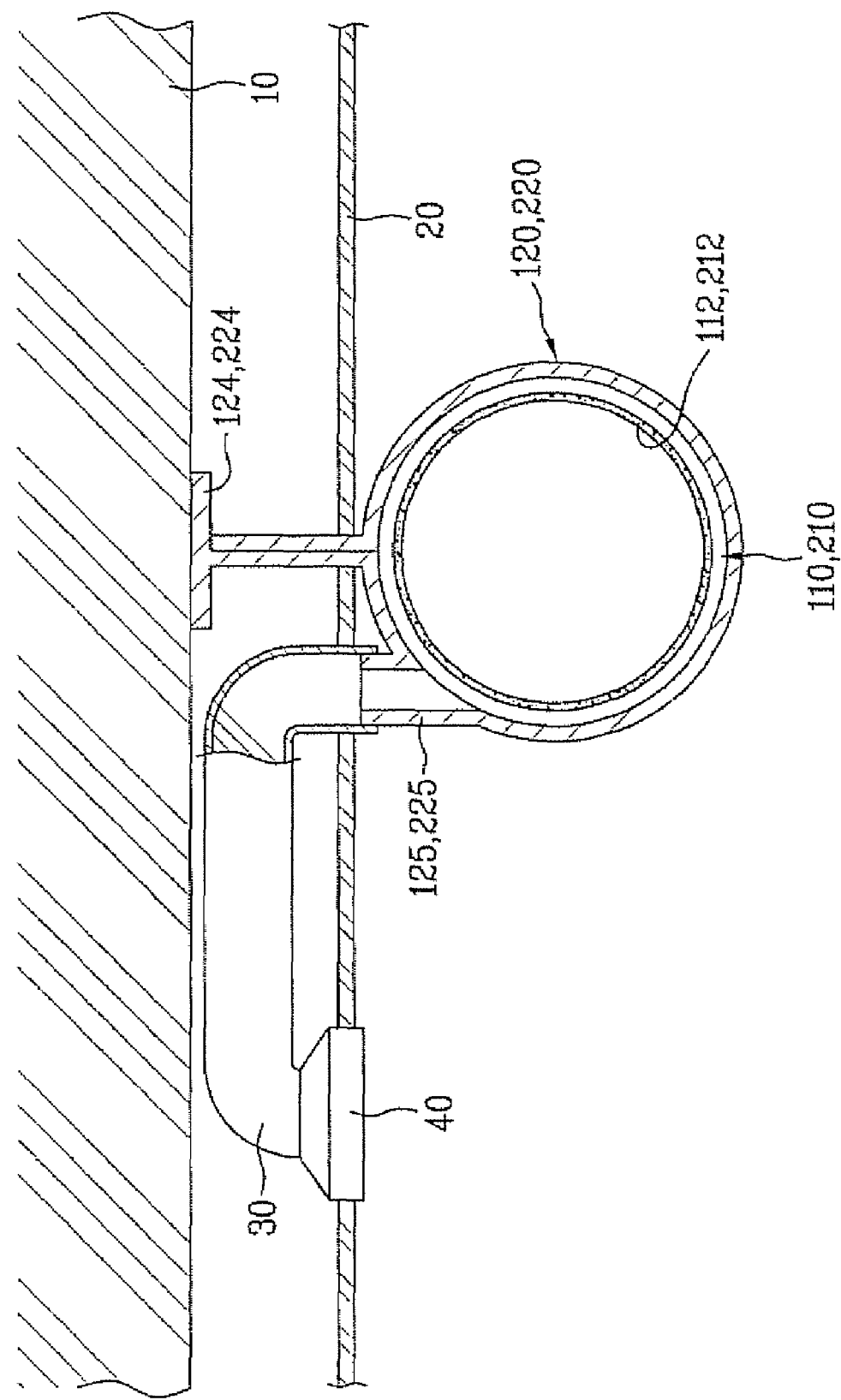

In FIG. 6, the optical pipes 110, 220 and the connector 120, 220 are arranged under the fake ceiling 20, the first and second extensions 122, 222 and 123, 223 are installed to penetrate the fake ceiling 20, and the support 124, 224 is securely fixed to the real ceiling 10 by the fastening member 132, 232.

IF so, the optical pipes 110, 220 and the connector 120, 220 are exposed under the fake ceiling 20 and the connecting nipple 125, 225 provided onto the connector 120, 220 is arranged directly beneath the fake ceiling 20. The diverging pipe 30 or the nipple 125, 225 is installed to penetrate the fake ceiling 20 and the diverging pipe 30 is connected to the diffuser 40.

Hence, even if the optical pipes 110, 220 and the connector 120, 220 are installed as shown in FIG. 6, the connecting nipple 125, 225 and the diverging pipe 30 can be hidden behind the fake ceiling 20.

In operation, if natural or artificial light is applied into the optical pipe 110, 210, the light is totally reflected by the total reflection layer 112, 212 to proceed in a length direction of the optical pipe 110, 210. Hence, the optical pipe 110, 210 emits light to illuminate an indoor space under the fake ceiling 20.

If air is supplied into the optical pipe 110, 210, the air proceeds in the length direction of the optical pipe 110, 210, diverges into the diverging pipe 30 connected the connector 120, 220, and is then supplied to the indoor space under the fake ceiling 20 via the diffuser 40.

On the other hand, if air within the optical pipe 110, 210 is discharged outside, the indoor air under the fake ceiling 20 is introduced into the connector 120, 220 via the diffuser 40 and the diverging pipe 30. The air introduced into the connector 120, 220 proceeds along the optical pipes 110, 220 to he externally discharged.

In the above description of the embodiments of the present invention, configurations enabling both of the air and the light to pass through the optical pipe 110, 210 and the connector 120, 220 without being separated from each other are explained for example. Yet, the presence invention can be further developed into a configuration that air and light are separated from each other to pass through the optical pipe 110, 210 and the connector 120, 220. Thus, a separating member enabling air and light to pass through by being separated from each other is explained with reference to FIG. 7 and FIG. 8 as follows.

Figure 7:
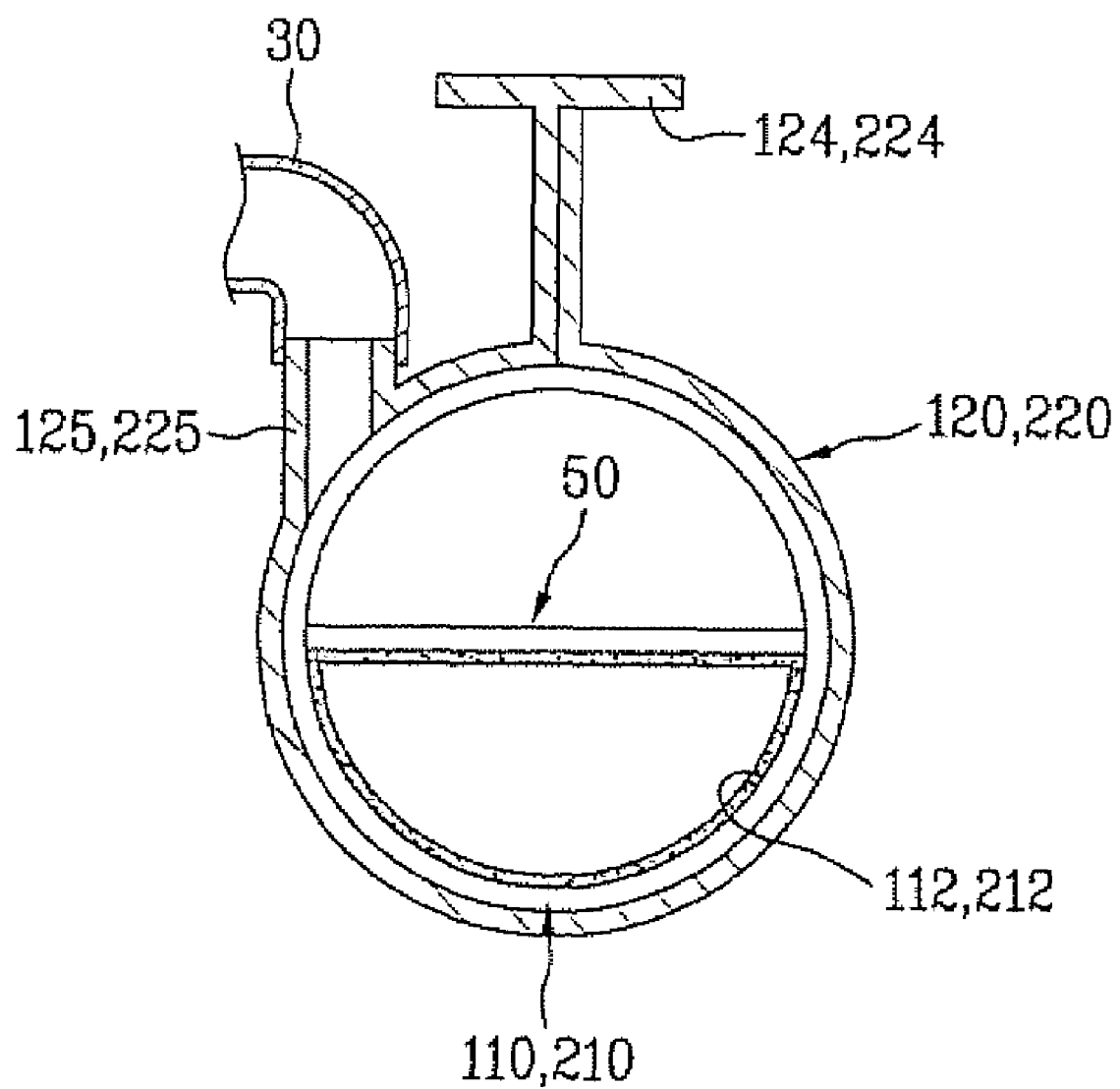
FIG. 7 is a cross-sectional diagram of a separating panel for separating air and light from each other.

First of all, a separating plate 50, as shown in FIG. 7, can be provided within the optical pipes 110, 210 and the connector 120, 220. The separating plate 50 divides the internal space of the optical pipe 110, 210 or the connector 120, 220 into two independent spaces, i.e., an upper space and a lower space.

The upper space formed above the separating plate 50 configures an air path to communicate with the diverging pipe 30. And, the lower space configured below the separating plate 50 configures a light path. In this case, to reduce light loss, the total reflection layer 112, 212, as shown in FIG. 7, can be provided to a lower surface of the separating plate 50.

For another instance, a separating pipe 60, as shown in FIG. B, can be provided within the optical pipe 110, 210 and the connector 120, 220. The separating pipe 60 divides an internal space of the optical pipe 110, 210 or the connector 120, 220 into two independent spaces, i.e., an inner space and an outer space.

Figure 8:
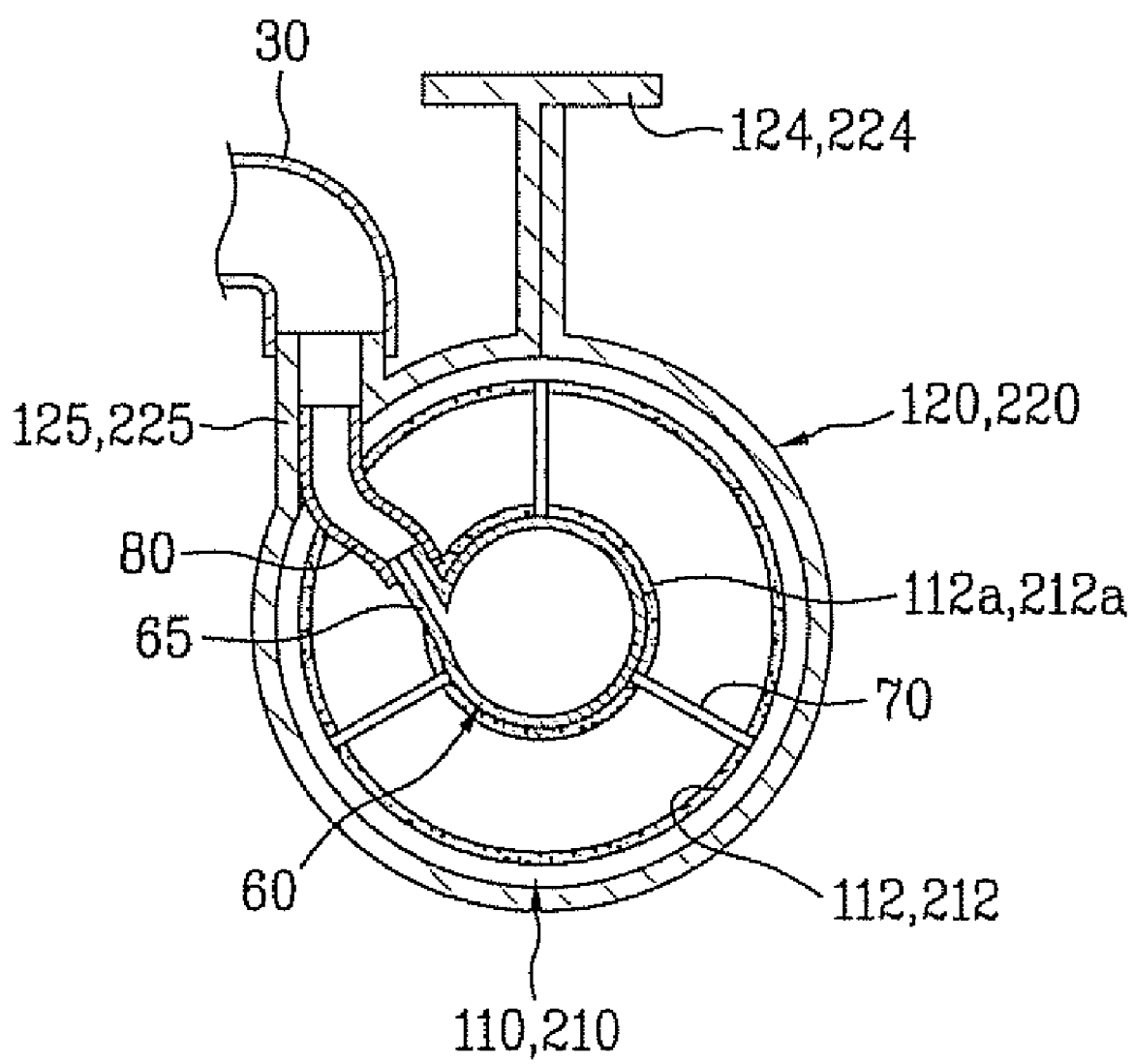
FIG. 8 is a cross-sectional diagram of a separating pipe for separating air and light from each other.

The space formed within the separating pipe 60 configures an air path to be connected to the diverging pipe 30. For this, as shown in FIG. 8, a connecting nipple 65 is provided to the separating pipe 60 and a connecting pipe 80 is installed to connect the connecting nipple 125, 225 of the connector 120, 220 and the connecting nipple 65 of the separating pipe 60 together.

The outer space formed outside the separating pipe 60 configures a light path. To support the separating pipe 60, a supporter 70 can be provided between the separating pipe 60 and the optical pipe 110, 210 or the connector 120, 220. The supporter 70 supports the separating pipe 60 so that the separating pipe 60 can be placed in a center of the optical pipe 110, 210 or the connector 120, 220. And, a total reflection layer 112a, 212a, as shown in FIG. 8, can be formed on an outer surface of the separating pipe 60 to reduce loss of light passing through the outer space.

Accordingly, the present invention provides the following effects or advantages.

First of all, by performing illumination and ventilation simultaneously, an installation space for the combined illumination and ventilation duct is reduced, an installation work of the combined illumination and ventilation duct is facilitated, and a layout design of the combined illumination and ventilation duct is relatively simplified.

Secondly, by providing the connecting nipple to the connector, the diffuser can be connected to the combined illumination and ventilation duct without processing the optical pipe separately.

Thirdly, by forming the connector of a flexible material, the end portion of the optical pipe can be prevented from being broken or damaged.

Finally, by providing the projection to the optical pipe and by providing the groove to the connector, the optical pipe can be prevented from being separated from the connector.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An illumination-and-ventilation combined system comprising:
   at least two optical pipes each having a total reflection layer on an inner surface thereof, and through which air flows and through which light proceeds by being substantially totally reflected by the total reflection layer to perform ventilation and illumination;
   a connector connecting the at least two optical pipes together, the connector having a connecting nipple; and
   a diverging pipe connected to the connecting nipple and in communication with an indoor space of a building,
   wherein the diverging pipe allows air to flow between the indoor space and an inside of the connector for ventilation of the indoor space.

2. The illumination-and-ventilation combined system of claim 1, wherein the connector is formed of a flexible material.

3. The illumination-and-ventilation combined system of claim 1, wherein the connector is detachably connected to each of the at least two optical pipes.

4. The illumination-and ventilation combined system of claim 1, wherein the connector is cut along a length direction thereof to be open or closed.

5. The illumination-and-ventilation combined system of claim 4, wherein the connector comprises:
   a pair of extensions extending from both edges of the cut connector, respectively, the extensions adhering closely to each other when the connector is closed, the extensions fixed to each other by a coupling member.

6. The illumination-and-ventilation combined system of claim 5, wherein the connector further comprises a support extending from at least one of the extensions to be securely fixed to a ceiling by a fastening member.

7. The illumination-and-ventilation combined system of claim 1, wherein the connecting nipple is configured to project from an outer surface of the connecter to be arranged between a center of the connector and an upper end of the connector.

8. The illumination-and-ventilation combined system of claim 1, wherein opposing end portions of the at least two optical pipes connected together by the connector are aligned within the connector to be spaced apart from each other and further wherein the connecting nipple is arranged between the opposing end portions of the at least two optical pipes.

9. The illumination-and-ventilation combined system of claim 1, further comprising:
   at least one projection provided on an outer circumference of an end portion of each of the at least two optical pipes; and
   at least one groove provided to an inner circumference of the connector to correspond to the at least one projection.

10. The illumination-and-ventilation combined system of claim 9, wherein the at least one projection and groove are formed along circumferential directions of each of the at least two optical pipes and the connector, respectively.

11. The illumination-and-ventilation combined system of claim 1, wherein the pipe connected to the connecting nipple is configured to be connected to a diffuser communicating with an indoor space.

12. The illumination-and-ventilation combined system of claim 1, wherein each of the at least two optical pipes, comprises:
   a tube transmitting a light; and
   the total reflection layer is formed on an inner surface of the tube to totally reflect the light.

13. A combined illumination and ventilation duct comprising:
   at least two optical pipes through which air flows and through which light proceeds by being substantially totally reflected to perform ventilation and illumination;
   a connector connecting the at least two optical pipes together, the connector having a connecting nipple connected to a pipe to provide ventilation; and
   a separating member separating the air and the light flowing through the duct from each other to flow.

14. A combined illumination and ventilation duct comprising:
   at least two optical pipes through which air flows and through which light proceeds by being substantially totally reflected to perform ventilation and illumination;
   a connector connecting the at least two optical pipes together, the connector having a connecting nipple connected to a pipe to provide ventilation; and
   a separating plate provided within each of the at least two optical pipes or the connector to divide an internal space of the connector into an upper space for air flow and a lower space for light flow.

15. The combined illumination and ventilation duct of claim 14, wherein a total reflection layer is formed on an inner surface of each of the at least two optical pipes and a lower surface of the separating plate to totally reflect the light.

16. A combined illumination and ventilation duct comprising:
   at least two optical pipes through which air flows and through which light proceeds by being substantially totally reflected to perform ventilation and illumination;
   a connector connecting the at least two optical pipes together, the connector having a connecting nipple connected to a pipe to provide ventilation; and
   a separating pipe provided within each of the at least two optical pipes or the connector to divide an internal space of the connector into an inner space for air flow and an outer space for light flow.

17. The combined illumination and ventilation duct of claim 16, wherein a total reflection layer is formed on the inner surface of each of the at least two optical pipes and the outer surface of the separating pipe to substantially totally reflect the light.

18. The combined illumination and ventilation duct of claim 16, further comprising a supporter provided between the separating pipe and each of the at least two optical pipes or the connector to support the separating pipe to lie in a center of each of the at least two optical pipes or the connector.

19. The combined illumination and ventilation duct of claim 16,
   wherein the separating pipe further comprises a connecting nipple, and further wherein the combined illumination and ventilation duct further comprises a connecting pipe connecting the connecting nipple of the separating pipe and the connecting nipple of the connector together.

20. An illumination-and-ventilation combined system comprising:
   at least two optical pipes each having a total reflection layer on an inner surface thereof, and having air flow inside wherein light proceeds within the at least two optical pipes by being substantially totally reflected by the total reflection layer and wherein upper parts of the at least two optical pipes are embedded in a false ceiling provided under a real ceiling to be spaced apart from the real ceiling, wherein the at least two optical pipes perform ventilation and illumination;
   a connector connecting the at least two optical pipes together, the connector having a connecting nipple arranged between the false and the real ceilings; and
   a diverging pipe connected to the connecting nipple and in communication with an indoor space of a building,
   wherein the diverging pipe allows air to flow between the indoor space and an inside of the connector for ventilation of the indoor space.

* * * * *